Feb. 23, 1932. L. B. BRIDGES 1,846,509
THREAD CUTTER
Filed July 29, 1929  2 Sheets-Sheet 2
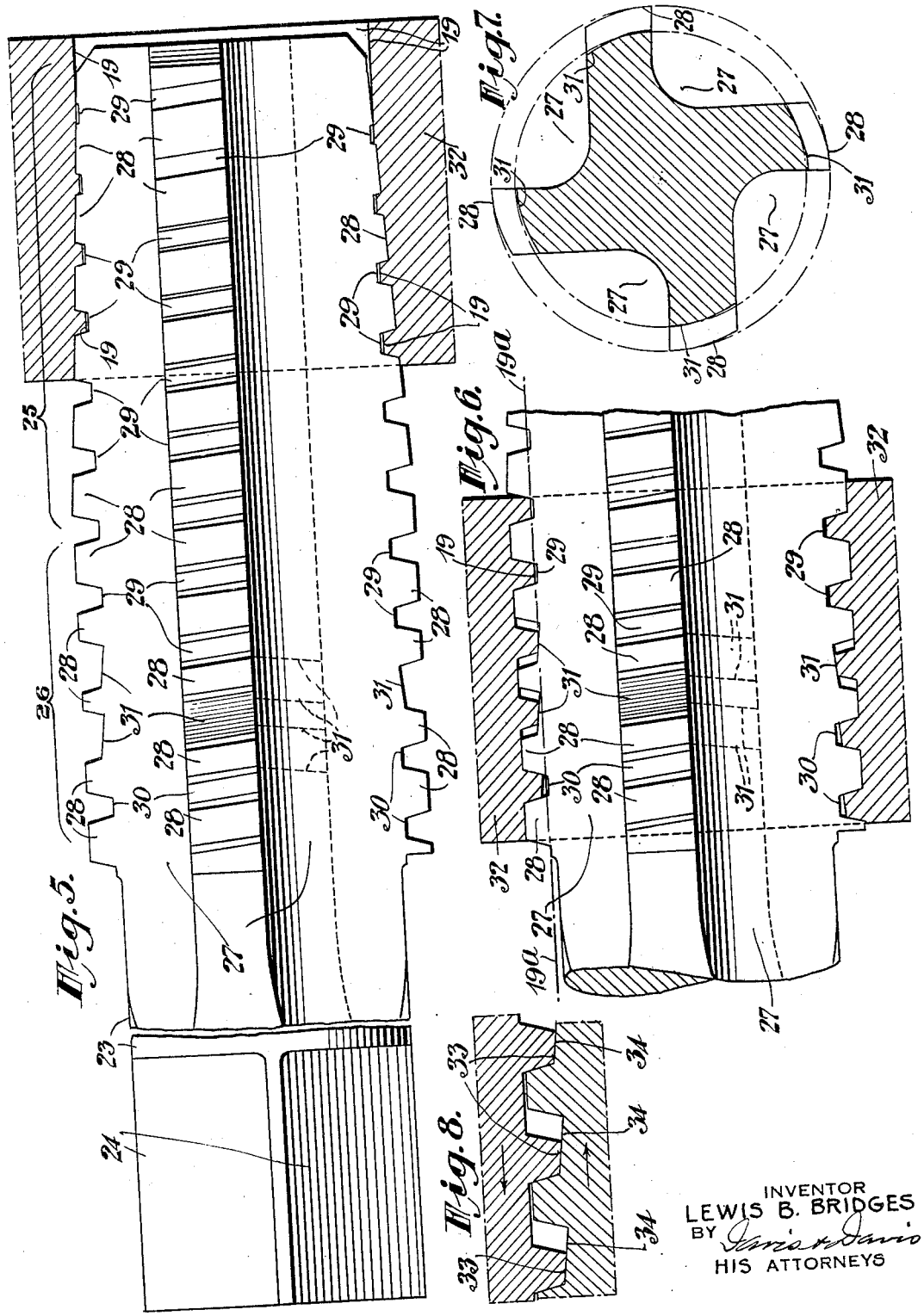
INVENTOR
LEWIS B. BRIDGES
BY
HIS ATTORNEYS Patented Feb. 23, 1932

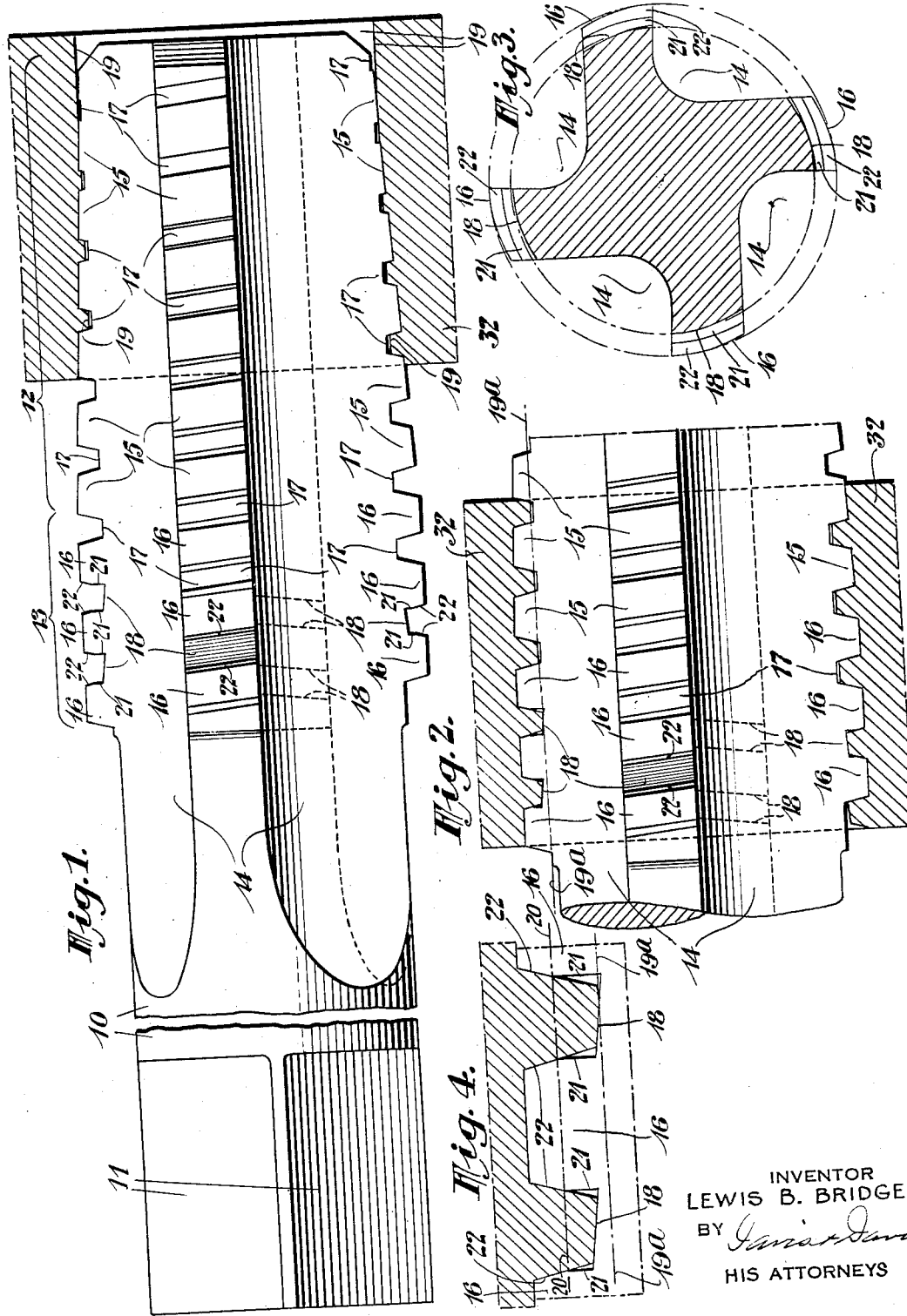

1,846,509

UNITED STATES PATENT OFFICE

LEWIS B. BRIDGES, OF BROOKLYN, NEW YORK, ASSIGNOR TO DARDELET THREADLOCK CORPORATION, OF NEW YORK, N. Y., A CORPORATION OF DELAWARE

THREAD CUTTER

Application filed July 29, 1929. Serial No. 381,811.

This invention relates to improvements in thread cutters for cutting Dardelet screw threads having locking surfaces on the crest of the thread rib inclined relatively to the axial line of the thread transversely of the rib, the invention being particularly applicable to taps and other cutters for cutting standard Dardelet internal threads.

The principal objects of the invention are to provide simple and efficient means for accurately cutting at a single operation screw threads of the kind above mentioned; to provide a thread cutting tool for cutting threads of the kind referred to, and particularly a tap for cutting standard Dardelet internal threads, which will first gradually develop the thread rib without acting on the crest surface of the rib and then gradually, but relatively quickly, trim off the crest of the rib to accurate size and taper; to provide a thread cutter having teeth with chamfered tops and non-cutting interdental portions for gradually developing the thread rib followed by teeth with top edges parallel with the axis of rotation of the cutter and interdental portions with thread rib crest trimming cutting edges inclined to the axis of rotation of the tool and wider than the non-cutting interdental portions; to provide a thread cutter having at its entering end a helical series of teeth gradually increasing in height and a following helical series of teeth of uniform height, the interdental portions between the first series of teeth being of equal width and parallel with the axial line of the tool and the interdental portions between the second series of teeth being wider and farther from the axial line of the tool and inclined to the axial line of the tool; to provide a tap for first developing a thread groove and then trimming the thread rib crest to a taper with cutting edges wider than the rib along the line of cut wherein the tap thread will have a bearing on the sides of the rib at both sides of the relatively wide crest trimming cutting edges and a bearing on the bottom of the developed thread groove at both sides of each of said crest trimming cutting edges; and to provide a tapered tap for first completely, or substantially completely, developing the groove of a Dardelet thread, and then finishing the locking surface on the crest of the thread rib by relatively wide cutting edges, so constructed that the non-tapered thread cutting portion of the tap may be made quite short without impairing the accuracy of formation of the thread.

Other objects and advantages of the invention will appear from the following description in detail of the invention as embodied in the taps shown in the accompanying drawings.

In the drawings:

Fig. 1 is a side view of a tap embodying the invention, showing a nut blank being acted on by the tapered entering portion of the tap;

Fig. 2 a fragmentary side view of the tap, showing the nut blank being acted on by the non-tapered finishing portion of the tap;

Fig. 3 a sectional view of the tap broken through the leading four interdental cutting portions of the tap on the four lands of the tap;

Fig. 4 a detail view on an enlarged scale showing the nut blank and the tap land carrying the leading and fifth ones of the interdental cutting edges;

Figs. 5, 6 and 7, views similar, respectively, to Figs. 1, 2 and 3, showing a slightly modified form of tap; and Fig. 8 a fragmentary longitudinal sectional view of a bolt and nut provided with standard Dardelet threads, the engaged threads being relatively displaced axially of the bolt and nut into self-holding relation.

The preferred embodiment of the invention disclosed in Figs. 1 to 4 will first be described. The tap has a cylindrical shank portion 10, preferably long enough to receive several finished nuts and squared at its outer end to provide the usual attachment portion 11, and has a fluted and threaded body comprising a tapered entering portion 12 and a non-tapered finishing portion 13. The body preferably has four flutes 14 providing four lands cut by the groove of the tap thread to leave upon the lands a helical set of teeth and a helical set of interdental portions.

The set of teeth comprises a leading helical series of teeth 15 gradually increasing in height and having chamfered tops sloping toward the entering end of the tap and a following helical series of teeth 16 of uniform height having top leading edges parallel with the axis of the tap. The tops of teeth 15 and 16 are preferably given a slight relief back of their leading cutting edges, as shown.

The set of interdental portions comprises a leading helical series of interdental portions 17, all concentric with the axial line of the tap with their tops the same distance from the tap axis and parallel therewith, and a following helical series of interdental portions 18 all located preferably on the non-tapered portion of the tap between teeth of the tooth series 16 and having tops sloping toward the entering end of the tap at an angle to the tap axis of six degrees.

The interdental portions 17 all preferably lie within a projection of the original cylindrical bore 19 of nut blanks the tap is designed to thread, as shown, i. e. the root diameter of that part of the tap thread having the interdental portions 17 is made slightly less than the internal diameter of the nut blanks the tap is designed to thread so that interdental portions 17 will not cut metal from the nut blank or touch the bore surface of the blank. The interdental portions 18 are cutting portions and are wider than portions 17 and wider than the developed thread rib presented for their trimming action along their lines of cut.

All of said portions 18 have their leading cutting edges sufficiently radially displaced from the axis of the tap to permit them to function as cutters to insure trimming away the crest of the thread rib to the desired size and taper. Preferably the displacement is such that the trimming is effected in steps. In the construction shown, the leading cutting interdental portion 18 is displaced so that its effective cutting edge portion crosses the original bore line 19 of the nut blank between the side edges of the untrimmed rib presented thereto so as to take a cut slightly less than the full width of the untrimmed thread rib at the crest. The second portion 18 is slightly farther displaced from the axis of the tap to take a cut entirely across the rib, and the remaining four of the six cutting portions 18 are radially displaced still farther to such a distance that the third cutting portion will finish the thread rib to desired size and taper.

The radial displacement of each of the third, fourth, fifth and sixth cutters 18 is the same, the fourth, fifth and sixth cutters serving to smooth the crest and insure cutting the crest to accurate size and taper, and giving the tap a greater term of usefulness, since the leading cutters of the series may be reground repeatedly leaving one or more cutters 18 of original size to insure accurate cutting of the thread. The tops of the interdental cutting portions 18 are also preferably slightly relieved back of their cutting edges, as shown.

The tops of all of the teeth 16 on the non-tapered body portion of the tap are of the same width and are equal in width to the width of the root portion or bottom surface of the finished nut thread groove. The sides of all the teeth 15 slope at an angle of 14½ degrees from a perpendicular to the axial line of the tap, the two side faces of each tooth converging toward the crest of the tooth. The widening of interdental portions 18 relatively to interdental portions 17, heretofore referred to, is effected by widening the inner portion of the thread groove of the tap along that part of the groove having the inclined bottom, leaving the sides of the top portions of those teeth 16 which are located at opposite sides of each interdental portion 18 of the same 14½ degree slope from a perpendicular to the tap axis as the sides of teeth 15, as shown at 22. Preferably the sides of teeth 16 at each side of each interdental portion 18 on a land are all formed perpendicular to the axis of the tap from the top of the interdental portion to a line 20—20 (Fig. 4) parallel with the tap axis and cutting the teeth about midway between the crests and bases of the teeth, as shown at 21.

The foregoing arrangement affords a cutting edge on each interdental portion substantially wider than the cut such edge has to make, so that portion 18 may be more readily and economically formed on the tap with effective cutting edge portions of the proper 6 degree slope throughout, any slight rounding in the corners not affecting the accuracy of profile of the effective portion of the cutting edge.

Furthermore, the teeth having the straight side faces 21 have top portions with crest and side edge cutting portions conforming with the root portion of the finished thread so that they may insure completion of the thread groove to full depth and accurate profile, thus enabling arrangement of the series of crest trimmers 18 to start immediately where the tap body taper ends, if desired, as shown, so that the tap thread portion on the non-tapered body portion of the tap may simultaneously finish both the root and crest of the nut thread after the nut thread groove has been developed substantially to full depth.

It will also be observed that said teeth 16 contact on their tops with the bottom of the groove of the nut thread and on their sides adjacent their tops with the sides of the nut thread rib, so that the entire set of tap teeth 15—16 has lead screw side face portions for advancing the tap relatively to the nut at the thread pitch rate, so that the tap is held accurately centered in the blank during finishing of the thread notwithstanding the fact that interdental cutting portions wider than the nut thread rib are provided extending through one or more turns around the tap, and so that the provision of such wide crest trimmers does not necessitate the provision of a supplemental lead off screw portion of the tap thread between the finishing zone and shank.

It will also be observed that the nut thread rib is supported by two teeth 16 at each side of each wide cutter 18 at both sides of the rib and the tops of said two teeth bear on the nut thread groove bottom at both sides of the cutter 18, thus greatly minimizing liability of inaccurate cutting of the nut thread rib crest that might otherwise result from slight distortion of either the tap or nut.

It will be obvious that the described arrangement permits making of an efficient tapered tap for cutting Dardelet threads which may be relatively short while at the same time having a sufficiently long and slightly tapered entering end portion for easy action. It will be further evident that the work of cutting the complete thread is advantageously distributed on the tap.

The modified form of tap shown in Figs. 5, 6 and 7 is substantially the same as that heretofore described except for the fact that the crest trimming interdental portions are wider, the tap thread groove being widened from top to bottom by cutting back the adjacent sides of two teeth at the tops as well as near the bases of the teeth, and the tap thread having a lead off screw portion adjacent the shank beyond the crest finishing zone of the tap and full height teeth in advance of the crest finishing zone.

The shank 23 of the tap has the squared attachment portion 24, and the fluted and threaded body of the tap has the tapered entering portion 25 and non-tapered finishing portion 26, the body having four flutes 27 providing four lands cut by the tap thread groove so as to leave upon the lands a helical series of teeth 28. The teeth on the portion 25 of the tap gradually increase in height and have chamfered tops while the teeth on portion 26 have tops parallel with the tap axis and all equidistant from said axis, the tops of all the teeth being preferably relieved back of their leading edges.

The sides of all the teeth diverge toward the bases of the teeth preferably at an angle of 14½ degrees from a perpendicular to the tap axis. The tap thread is of uniform minimum diameter and its root surface is of uniform width, except for one and one-half turns intermediate the ends of the non-tapered portion 26 of the body, leaving two helical series of non-cutting interdental portions 29 and 30, and an intermediate helical series of wider nut thread rib crest trimming interdental portions 31 on the lands.

There are six of the cutting portions 31 extending through one and one-half turns of the tap thread and having their cutting edges radially arranged in the same manner as the series of six cutting portions 18 of the tap shown in Figs. 1 to 4. The adjacent faces of the two teeth at either side of each interdental portion 31 are cut back from top to bottom, preferably while maintaining the 14½ degree slope, to afford the wide cutting edges for portions 31 exceeding materially the width of cut these portions have to make across the nut thread rib. The tops of portions 31 have the same 6 degree slope relatively to the tap axis as cutters 18 and are preferably relieved slightly back of their leading or cutting edges.

By cutting back the adjacent sides of two adjacent teeth, as described, wider interdental cutting portions 31 are possible than in the construction shown in Figs. 1 to 4 but these teeth have no side bearing on the nut thread rib at opposite sides of portion 31 therebetween and no cutting side edge portions on their cut back faces. These teeth do, however, have tops coactive with different width portions of the thread groove bottom which assist in centering the tap and nut relatively to each other and which have cutting leading edges which will assist in finishing the bottom of the thread groove of the nut if the teeth in advance thereof do not remove all the necessary metal for completely developing the groove. It will be observed from Figs. 5 and 6 that on each land, one of the teeth at opposite ends of the single cutter 31, or of the series of cutters 31 on the land, has a side cutting edge at one side while the other has a side cutting edge at the opposite side, to thereby assist in finishing both sides of the nut thread groove if necessary. Preferably, however, the tap has a short helical series of full size teeth in advance of the leading crest trimmer interdental portion 31 which will complete the development of the groove prior to trimming of the crest of the nut rib, at least prior to considerable dulling of the tap and wear of the tap incidental to repeated use and regrinding. It will also be observed that a short helical series of full size teeth follows the series of crest trimming portions so that the nut is held centered until the thread is finished and fed off on to the shank of the tap after finishing, and so that the tap is always advanced through the nut at the pitch rate until the threading is entirely completed. A comparison of Figs. 1 and 5 will show that for a given size and taper, a tap constructed as in Fig. 1 will be materially shorter than one constructed as shown in Fig. 5, although both taps are shorter than taps at present employed in cutting Dardelet threads. In both taps, the tap thread extends in a continuous helix from end to end except for the interruptions thereof by the flutes.

The projection of the original cylindrical bore 19 of the nut blank 32 is indicated at the inner portion of the body of both forms of taps by the line 19ª.

In Fig. 8 the standard Dardelet nut thread cut by the taps is shown with its helicoidal locking surface portion 33 tightly jammed on the coactive helicoidal locking surface portion 34 of a standard Dardelet bolt thread in the well known manner.

By omitting all, or substantially all, of the tapered portion 12 of the tap shown in Figs. 1 to 4, and of the tapered portion 25 of the tap shown in Figs. 5 to 7, improved finishing taps of the plug type may be constructed suitable for finishing previously roughed out threads, for example threads roughed out in a bottomed hole by a roughing tap threaded similarly to the tapered entering or roughing portions 12 and 25 of the taps illustrated.

What I claim is:

1. A tap comprising a shank, and a fluted and threaded body extending from one end of the shank and having a tapered roughing portion and a non-tapered finishing portion between the shank and roughing portion, the body thread being interrupted only by the flutes and extending upon both the roughing and finishing portions, the root of said thread being of constant width and also concentric with and equidistant from the tap axis throughout its width for the major part of the length of the thread, and the thread on a part of the non-tapered finishing portion of the tap body having a decreased base thickness and also having a widened thread-crest-finishing cutting root of increased radial displacement from the tap axis sloping throughout its width toward one end of the tap.

2. A tap as claimed in claim 1, wherein said widened root is interrupted at a plurality of points in its length by the body flutes, and the radial displacement of the leading edges of a plurality of the leading ones of the portions of the widened cutting root separated by the flutes increases in the order of recession of said root portions from the entering end of the tap.

3. A tap comprising a threaded body fluted to provide lands and having a tapered roughing portion and a non-tapered finishing portion, the body thread extending upon both said body portions and being interrupted only by the flutes to provide a continuous helical series of teeth and a continuous helical series of interdental portions on the lands, the teeth on the roughing portion having chamfered tops and progressively increasing in height as they approach the finishing portion and the teeth on the finishing portion being of uniform height and having tops parallel with the tap axis, the sides of all the teeth facing the ends of the body converging toward the tops of the teeth at angles to the tap axis of the same amplitude, the tops of a plurality of successive interdental portions on the finishing portion of the body having leading cutting edges and being substantially wider and farther from the tap axis than the remaining interdental portions and inclined to the tap axis from tooth base to tooth base toward one and the same end of the tap, the tops of the said remaining interdental portions having non-cutting leading edges and being parallel with the tap axis, and the sides of the teeth rising from the said wider cutting interdental portions having non-cutting leading edges.

4. A tap as claimed in claim 3, wherein said plurality of successive wider cutting interdental portions is both preceded and followed by a plurality of said remaining narrower non-cutting interdental portions, and the helical series of teeth rising from said wider interdental portions are preceded and followed by a plurality of teeth of maximum base width.

5. A tap as claimed in claim 3, wherein a plurality of successive ones of said wider cutting interdental portions located farthest from the entering end of the tap having the same radial displacement from the tap axis which displacement is of greater extent than that of the remaining ones of said wider interdental portions.

6. A tap as claimed in claim 3, wherein the top of the leading wider interdental portion is nearer the tap axis than the tops of the remaining ones of said wider interdental portions.

7. A fluted tap having a tapered roughing portion, a non-tapered finishing portion, and a tap thread which extends upon both said portions, characterized in that said thread has cutting sides and a cutting crest and a non-cutting root on the roughing portion and also has, for at least part of the length of the finishing portion, a widened and cutting root inclined to the tap axis and non-cutting side portions rising from said widened cutting root.

In testimony whereof I hereunto affix my signature.

LEWIS B. BRIDGES.